United States Patent

[11] 3,579,154

[72] Inventor Glen W. Deen
Richardson, Tex.
[21] Appl. No. 818,590
[22] Filed Apr. 23, 1969
[45] Patented May 18, 1971
[73] Assignee Collins Radio Company
Dallas, Tex.

[54] VHF FILTER HAVING ABSORPTIVE TUNED SECTION TO ELIMINATE NARROW SPURIOUS PASSBAND
11 Claims, 4 Drawing Figs.

[52] U.S. Cl. .......... 333/76, 333/70
[51] Int. Cl. .......... H03h 7/08
[50] Field of Search .......... 333/70, 73, 76; 321/69

[56] References Cited
UNITED STATES PATENTS

| | | | |
|---|---|---|---|
| 1,932,435 | 10/1933 | Aiken | 333/76 |
| 2,247,898 | 7/1941 | Wheeler | 333/77 |
| 2,270,416 | 1/1942 | Cork | 333/73C |
| 3,111,636 | 11/1963 | Ma | 333/76 |
| 1,823,687 | 9/1931 | Heising | 333/76 |

FOREIGN PATENTS

| | | | |
|---|---|---|---|
| 452,351 | 10/1927 | Germany | 333/77 |

*Primary Examiner*—Herman Karl Saalbach
*Assistant Examiner*—C. Baraff
*Attorneys*—Henry K. Woodward and Robert J. Crawford

ABSTRACT: Disclosed is a very high frequency filter for use with a high frequency radio transmitter which prevents transmission of harmonics. The filter includes an absorptive filter which eliminates spurious passbands resulting from interaction of components. The absorptive filter includes highpass filters arranged in an L-network.

PATENTED MAY 18 1971

3,579,154

INVENTOR.
GLEN W. DEEN

BY H. K. Woodward
ATTORNEY

INVENTOR.
GLEN W. DEEN

BY H. K. Woodward
ATTORNEY

VHF FILTER HAVING ABSORPTIVE TUNED SECTION TO ELIMINATE NARROW SPURIOUS PASSBAND

This invention relates generally to electrical filters, and in particular to filters for use in the very high frequency range of the electromagnetic spectrum.

Radio transmitters, especially high power transmitters, are normally connected to antennas through a plurality of band-pass and/or lowpass filters in order to minimize the transmission of harmonic frequencies. In a high frequency transmitter one type of lowpass filter network is referred to as a television interference (TVI) filter since its purpose is to suppress VHF harmonics that generally lie within television transmission frequency bands. The problem of effectively filtering the VHF harmonics is especially difficult because in the VHF range interaction of transmission line and filter components often produces a conjugate match in the line resulting in narrow but strong spurious passbands.

An object of this invention is an improved VHF filter.

Another object of the invention is a VHF filter connecting an HF transmitter to an antenna and preventing spurious VHF passbands.

A feature of the invention is an absorptive filter in combination with a plurality of lowpass filters which effectively absorbs spurious passbands.

Another feature of the invention is an absorptive filter comprising series and parallel connected highpass portions cooperatively functioning as an L-network to present a low standing wave ratio load on a transmission line above the highest operating frequency of a transmitter.

These and other objects and features of the invention will be more fully understood from the following detailed description and appended claims when taken with the drawings, in which:

Figure 1:
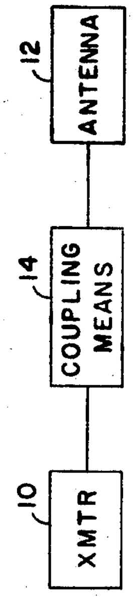
FIG. 1 is a block diagram of a radio transmission system including transmitter, antenna, and coupling means.

Referring now to the drawings, in FIG. 1 a radio transmitter system is illustrated in block form including a transmitter 10, a load antenna 12, and coupling means 14 interconnecting the transmitter 10 and antenna 12. Typically, the coupling means comprises the transmitter output network which includes a plurality of lowpass filters and/or band-pass filters whose function is to prevent the transmission of harmonic frequencies of the transmitter operating frequency.

As discussed above, in high frequency radio transmitters the output network lowpass and/or band-pass filters are designed to prevent the transmission of very high frequency harmonics. Occasionally, however, the filters interact with the interconnecting transmission lines to produce narrow but very strong spurious passbands. The problem may be visualized by breaking the connection between two lowpass filters in the output network and examining the driving point impedance looking into the lowpass filter on the load side and examining the source impedance looking into the output of the lowpass filter on the transmitter side, keeping in mind that these two impedances are joined together by a section of transmission line. When making an insertion loss measurement, the output network is terminated in a characteristic impedance load and driven by a generator whose impedance is equal to the characteristic impedance. Under these conditions, the impedance looking into either filter will be approximately this characteristic impedance in the particular filter's passband, but at frequencies above the passband (in the filter's stopband). the impedance looking into the particular filter will be highly reactive. That is to say, the real part of this impedance will be relatively small and the imaginary part will be relatively large in comparison thereto. A spurious passband can result at a particular stopband frequency if the imaginary part of the impedance looking into one of the filters, translated across the transmission line interconnecting the two filters, cancels the imaginary part of the impedance looking into the other low pass filter. This cancellation is possible because of the impedance inversion property of a quarter wavelength transmission line. The occurrence of this situation produces a condition which approximates a conjugate match. The insertion loss of the lowpass filters at this particular frequency is then determined primarily by the mismatch of the real portions of the impedances looking into the two filters, assuming the filters themselves are essentially lossless, which can result in a minimum insertion loss at the spurious frequency.

The spurious passband may be expeditiously eliminated by inserting an absorptive filter network which behaves like an L-pad attenuator above a design cutoff frequency and behaves like a lossless, lumped element section of transmission line below the cutoff frequency. In accordance with the present invention, an absorptive filter is employed which is basically an L-network each branch of which is itself a highpass filter. Each highpass filter is a ladder network of shunt inductors and series capacitors, with each filter terminated in a particular design value of load resistance. The highpass filter which is placed in series with the transmission line is synthesized for a constant current generator, that is the filter has a shunt inductor as its first element. The highpass filter which is placed in shunt with the transmission line is synthesized for a constant voltage generator, that is a series capacitor is the first element in the ladder network. The cutoff frequency for both highpass filters must be exactly the same and will always be somewhat higher than the highest operating frequency of the transmitter since the entire operating frequency range of the transmitter must be within the stopbands of both highpass filters so that that loads in these filters will not absorb appreciable fundamental power. The highpass filter loads' sole function should be to dissipate only the higher frequency harmonic signals including any spurious passband signal.

The load resistor for the constant voltage shunt connected highpass filter may be chosen to be some arbitrary constant times the nominal load impedance of the transmission line in which the filter is to be employed. The load impedance for the constant current highpass filter that is connected in series with the transmission line must have a value equal to the characteristic impedance of the transmission line divided by this same constant. For example, for a 150 ohm characteristic impedance transmission line the load resistance in the shunt connected highpass filter may be 450 ohms or three times the characteristic impedance, while the load resistance in the series connected highpass filter is 50 ohms, or the characteristic impedance divided by three. Such an L-pad attenuator whose series arm has a resistance of one-third the characteristic impedance and whose shunt arm has a resistance of three times the characteristic impedance will have an attenuation value of about 3 db. Other impedance ratios will produce other amounts of attenuation. However, the contribution of the L-pad attenuator lies not only in the amount of attenuation it provides to a matched load and source but also through the amount of shrinking it can provide to a very large voltage standing wave ratio load to prevent that impedance from forming a near conjugate match with the likewise large voltage standing wave ratio of the source impedance. A 3 db. L-pad attenuator will shrink an infinitely large voltage standing wave ratio to a value no greater than about 3:1. It is this property of isolating the load impedance from the source impedance that enables the absorptive filter to prevent a near conjugate match and eliminate the spurious passband.

The driving point impedance of each highpass filter below the cutoff frequency (in the operating frequency range of the transmitter) is approximately the same as the impedance of the input element of the particular filter. Thus, an equivalent circuit of the absorptive filter below cutoff is an L-network comprising a series inductor and a shunt capacitor. This network is a lumped element approximation to a transmission line. When the load resistances of the filters are chosen as described and the filters have the same number of poles and the same cutoff frequency, the ratio of the inductance of the input element of the series connected filter to the capacitance of the input element of the shunt connected filter will have a value such that the characteristic impedance of the resulting lumped element transmission line section will be exactly the same as the characteristic impedance of the primary transmission line and filter system.

Figure 2:
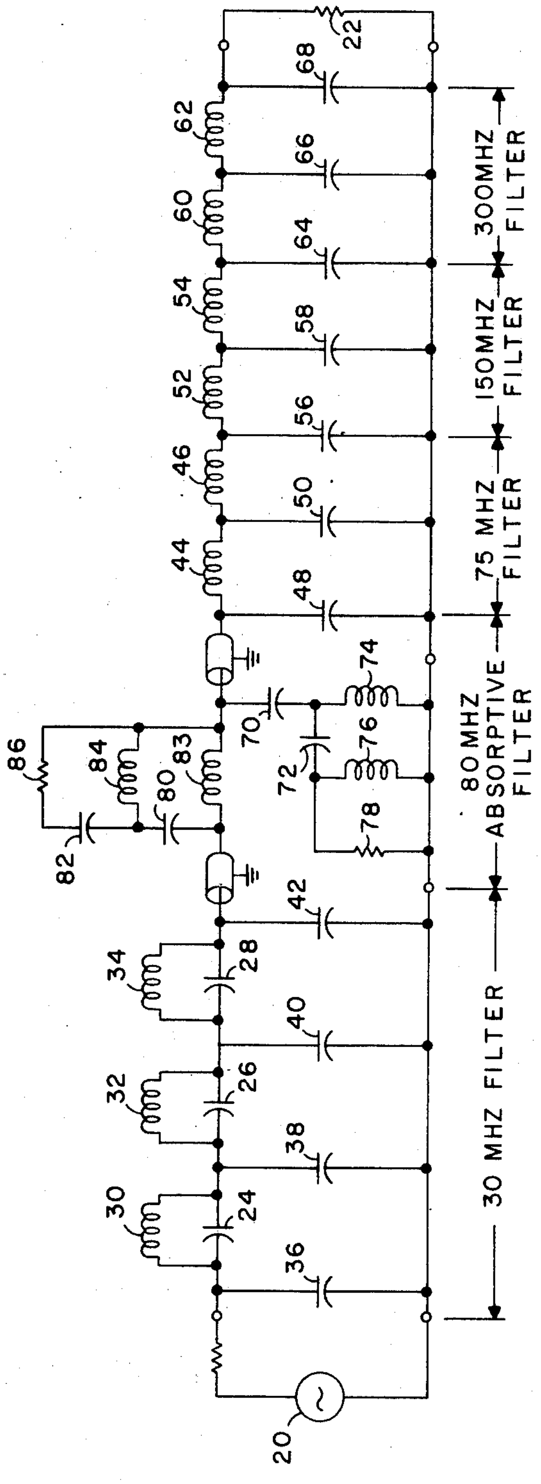
FIG. 2 is a schematic of a VHF filter and absorptive filter in accordance with the preset invention.

FIG. 2 is the schematic of one embodiment of a TVI filter including an absorptive filter in accordance with the present invention which interconnects a high power, high frequency radio transmitter 20 to an antenna load 22. The TVI filter includes in sequence a 30 megahertz lowpass filter, an absorptive filter, a 75 megahertz lowpass filter, a 150 megahertz lowpass filter, and a 300 megahertz lowpass filter connected between transmitter 20 and load 22. Because of the high power level, the filter inductors are physically large and exhibit half wave resonances at comparatively low frequencies. Half wave resonances produce spurious passbands which require additional filtering. Thus, each of the last three lowpass filters in the sequence provides filtering for the spurious passbands of the filter before it. The 30 megahertz lowpass filter is a 7 pole, 2 zero, Cauer lowpass filter including serially connected capacitors 24, 26 and 28 which are respectively shunted by inductors 30, 32 and 34, and further including shunting capacitors 36, 38, 40 and 42. Each of the other three lowpass filters are 5 pole Chebyshev lowpass filters with progressively higher cutoff frequencies. Capacitors 56 and 64 are shared by adjacent filters. The 75 megahertz filter includes serially connected inductors 44 and 46 and shunt capacitors 48, 50 and part of 56; the 150 megahertz filter includes serially connected inductors 52 and 54 and shunt capacitors 56 (the remaining portion thereof), 58 and part of 64; and the 300 megahertz filter includes serially connected inductors 60 and 62 along with shunting capacitors 64 (the remaining portion thereof), 66 and 68.

The absorptive filter includes a shunt highpass filter synthesized for a constant voltage generator and including capacitors 70 and 72 along with inductors 74 and 76 and load resistor 78. The serially connected highpass filter, synthesized for a constant current generator, includes capacitors 80 and 82, inductors 83 and 84, and load resistor 86. In this embodiment, each highpass filter is designed to cut off at 80 megahertz. As indicated above, the highpass filters contain only enough reactive components to limit fundamental power dissipation in the terminating load resistors to a conveniently low value. Below 30 megahertz, the absorptive filter network functions as a lossless, L-section lumped element transmission line with a characteristic impedance of 150 ohms. Above 80 megahertz, this network functions as a 3 db. L-pad attenuator.

Figure 3:
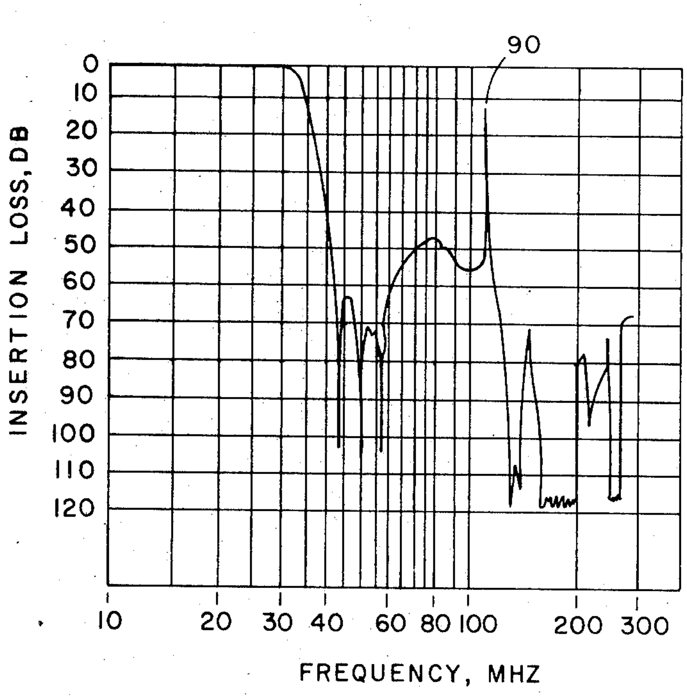
FIG. 3 is a graph illustrating insertion loss of the TVI filter shown in FIG. 2 without an absorptive filter in accordance with the present invention.
Figure 4:
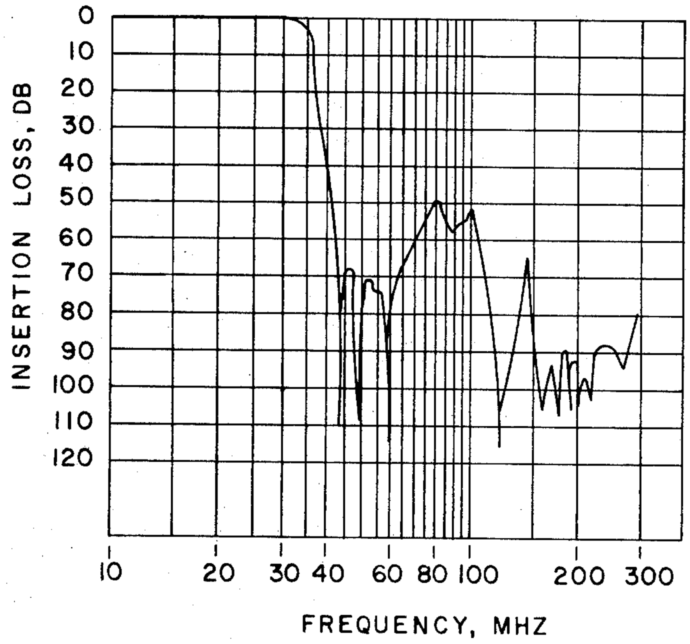
FIG. 4 is a graph illustrating the insertion loss of the TVI filter including an absorptive filter in accordance with the invention as shown in FIG. 2.

The effect of the absorptive filter on the insertion loss of the complete TVI filter is illustrated with reference to FIG. 3 and FIG. 4. FIG. 3 is a graph of insertion loss in db. versus frequency in megahertz for a TVI filter without the absorptive filter installed therein. It will be observed that the insertion loss increases considerably above the cutoff frequency of 30 megahertz and provides at least 45 db. of insertion loss in the VHF frequency range except for a spurious passband 90 at approximately 115 megahertz. FIG. 4 is a similar plot of insertion loss in db. versus frequency in megahertz for the TVI filter with the absorptive filter installed. It will be observed that the absorptive filter eliminates the spurious passband and virtually all insertion loss in the VHF range is at least 50 db.

Component values for the specific embodiment illustrated in FIG. 2 are given below:

| Component | | Value |
|---|---|---|
| 24 | pf... | 4.34 |
| 26 | pf... | 20.7 |
| 28 | pf... | 16.4 |
| 30 | μh... | 0.999 |
| 32 | μh... | 0.772 |
| 34 | μh... | 0.717 |
| 36 | pf... | 25.1 |
| 38 | pf... | 46.8 |
| 40 | pf... | 42.3 |
| 42 | pf... | 16.5 |
| 44 | μh... | 0.415 |
| 46 | μh... | 0.415 |
| 48 | pf... | 10.7 |
| 50 | pf... | 22.3 |
| 52 | μh... | 0.207 |
| 54 | μh... | 0.207 |
| 56 | pf... | 16.1 |
| 58 | pf... | 11.2 |
| 60 | μh... | 0.103 |
| 62 | μh... | 0.103 |
| 64 | pf... | 8.0 |
| 66 | pf... | 5.6 |
| 68 | pf... | 2.7 |
| 70 | pf... | 3.3 |
| 72 | pf... | 3.4 |
| 74 | ohms... | 450 |
| 76 | μh... | 1.5 |
| 78 | μh... | 0.56 |
| 80 | pf... | 25.0 |
| 82 | pf... | 67.0 |
| 83 | μh... | 0.073 |
| 84 | μh... | 0.076 |
| 86 | ohms... | 50.0 |

The harmonic filter described herein may be employed also following the output network of a transmitter to prevent the high VSWR antenna load impedance which normally exists at frequencies far above the operating frequency from reacting with the harmonic filter or output network source impedance in such a way as to radiate unwanted harmonic signals. Further, the absorptive filter described herein may also be employed in a diplexer connecting plural channels to an antenna to guarantee channel isolation by resistively terminating each diplexer filter section in the reverse direction in its own stopband, thus preventing the source impedance of the transmitter and its interconnecting transmission line from causing spurious resonances or "suck-outs" in the other channel.

While the invention has been described with reference to a specific embodiment, various modifications and changes therein may occur to those skilled in the art without departing from the spirit and scope of the invention.

I claim:

1. A harmonic filter for use with a radio transmitter comprising at least first and second lowpass filters having first and second cutoff frequencies, respectively, said second frequency being higher than said first frequency, an absorptive filter interconnecting said first and second lowpass filters, said absorptive filter including series and parallel portions forming an L-network which functions as an attenuator above a third frequency and which functions as an essentially lossless, lumped-element section of transmission line below said third frequency, said third frequency being higher than said first frequency.

2. A harmonic filter as defined by claim 1 wherein said series portion and said parallel portion are each a highpass filter.

3. A harmonic filter as defined by claim 2 wherein the cutoff frequencies of said series portion and said parallel portion are the same.

4. A harmonic filter as defined by claim 3 wherein each highpass filter has the same number of poles.

5. A harmonic filter as defined by claim 2 wherein said series portion is synthesized for a constant current generator and said parallel portion is synthesized for a constant voltage generator.

6. A harmonic filter as defined by claim 5 wherein said parallel portion includes a load resistance equal to a multiple of the nominal impedance of the transmission line to which said filter is connected and said series portion includes a load resistance equal to said nominal impedance of said transmission line divided by said multiple.

7. A filter comprising first and second lowpass filters having first and second cutoff frequencies, respectively, a first highpass filter serially connecting said first and second lowpass filters, and a second highpass filter connected to said first highpass filter to from an L-network which functions as an attenuator above a third frequency and as an essentially lossless, lumped-element section of transmission line below said third frequency, said third frequency being higher than said first frequency.

8. A filter as defined by claim 7 wherein said first highpass filter includes a shunt indicator as an input element and said second highpass filter includes a series capacitor as an input element.

9. A filter as defined by claim 8 wherein said first and second highpass filters have the same cutoff frequency and an equal number of poles.

10. An absorptive filter comprising a series highpass filter and a shunt highpass filter cooperatively forming an L-network, each of said highpass filters comprising a ladder network of shunt inductors and series capacitors, said series highpass filter including a shunt inductor as an input element, and each highpass filter being terminated in a single resistive load.

11. An absorptive filter as defined by claim 9 wherein said series highpass filter and said shunt highpass filter have the same cutoff frequency and an equal number of poles.

UNITED STATES PATENT OFFICE
CERTIFICATE OF CORRECTION

Patent No. 3,579,154 Dated May 18, 1971

Inventor(s) Glen W. Deen

It is certified that error appears in the above-identified patent and that said Letters Patent are hereby corrected as shown below:

Column 1, line 71, after "stopband)." should read -- stopband), --; Column 6, line 5, after "element," insert -- said shunt highpass filter including a series capacitor as an input element --.

Signed and sealed this 30th day of November 1971.

(SEAL)
Attest:

EDWARD M.FLETCHER,JR.
Attesting Officer

ROBERT GOTTSCHALK
Acting Commissioner of Patents